United States Patent [19]

Walters

[11] Patent Number: 4,459,860
[45] Date of Patent: Jul. 17, 1984

[54] FLOW SENSOR WITH EXTENDED LOW FLOW RANGE

[75] Inventor: Ronald B. Walters, Wembley, England

[73] Assignee: Sperry Limited, Cobham, England

[21] Appl. No.: 447,509

[22] Filed: Dec. 7, 1982

[30] Foreign Application Priority Data

Dec. 9, 1981 [GB] United Kingdom ................. 8137041

[51] Int. Cl.³ .............................................. G01F 1/22
[52] U.S. Cl. .................................... 73/861.55; 73/197
[58] Field of Search ........... 73/861.55, 861.53, 861.58, 73/861.47, 195, 197, 202

[56] References Cited

U.S. PATENT DOCUMENTS 3,472,275 10/1969 Castro et al. ................. 73/861.53 X
3,910,112 10/1975 Gerlach ............................ 73/861.53
4,235,105 11/1980 Walters ............................ 73/861.53
4,366,718 1/1983 Nelson .............................. 73/861.58

Primary Examiner—S. Clement Swisher
Assistant Examiner—Brian R. Tumm
Attorney, Agent, or Firm—Barnes, Kisselle, Raisch, Choate, Whittemore & Hulbert

[57] ABSTRACT

In a flow sensing device in which flow is measured by the linear displacement of a moveable bobbin within a throat, the bobbin contains a cylinder and piston arrangement, with the piston linked to the same linear displacement sensing device as the bobbin. Fluid pressures upstream and downstream of a calibrated orifice parallel to the throat, is applied to opposite ends of the piston. Low flow rates are measured by the displacement of the piston, with movement of the bobbin together with the piston taking over the flow sensing function at higher flow rates.

3 Claims, 4 Drawing Figures

FLOW SENSOR WITH EXTENDED LOW FLOW RANGE

This invention relates to flow sensing devices and in particular flow sensing devices for sensing the flow of fluid in hydraulic systems.

U.K. Pat. No. 1 335 041 (Sperry Rand Limited, R. B. Walters & D. A. Larner) describes, inter alia, a flow sensing device in which a variable annular flow sensing orifice is formed between a tapered throat in a section of fluid duct, and a circumferential crest on a bobbin mounted axially slidable in the throat. Hydraulic fluid flowing through the device causes the bobbin to be displaced against the action of a return spring from a position in which the crest of the bobbin lies within the narrowest part of the throat to a position further downstream where the throat is wider. The bobbin takes up a position within the throat at which the pressure drop across the now larger orifice is counterbalanced by the restoring force of a return spring. In the case of a bi-directional flow sensing device of this kind, the narrowest portion of the throat lies at the junction between two oppositely tapered throat surfaces and, at zero flow, the crest of the bobbin lies within that narrowest section, to be displaced in one or the other direction dependent on the direction of fluid flow. A uni-directional flow sensing device may be similarly constructed but will usually be arranged to have, for zero flow, the crest of the bobbin abut against the inner wall surface of the throat, thereby completely closing the fluid passage through the flow sensor.

Various mechanisms for converting either the pressure differential created across the flow sensing orifice or the displacement of the flow sensing bobbin into an electric feedback signal are known in the art.

The present invention aims to provide an improvement to flow sensing devices in which the linear displacement of the bobbin is employed to provide the flow sensing signal, by providing a mechanism which extends the low flow range sensing capability of such flow sensing devices.

According to the present invention, there is provided a calibrated by-pass orifice to the flow sensing orifice, and a cylinder-and-piston arrangement, in which opposite ends of the piston are in communication with the fluid pressure upstream and downstream of the calibrated by-pass orifice. The piston is linked to a linear displacement sensing device, which will usually be the same as that on which the bobbin operates. The linear displacement sensing device may be a device such as a variable resistor or, preferably, a linear variable displacement transducer (LVDT).

The cylinder and piston arrangement may conveniently be housed in the flow sensor bobbin, with an axial bore in the bobbin forming the cylinder, with a force transmitting spring arrangement coupling the forces experienced by the piston as a result of flow through the calibrated by-pass orifice, to the bobbin which itself is subject to restraining forces by a spring arrangement interposed between the bobbin and the flow sensor housing.

In operation, the pressure differential developed at low flow rates is insufficient to overcome the pre-load of the main spring or springs supporting the flow sensor bobbin but, being transmitted to opposite ends of the aforesaid piston, will cause the piston to execute a movement in the direction of the lower pressure. Movement of the piston ceases when the force due to the pressure difference is compensated by the restoring force of the force transmitting spring arrangement. The movement of the piston generates a corresponding displacement of the moveable part of the linear displacement sensing device.

The relative strengths of the force transmitting spring arrangements acting between the piston and the bobbin, and the main springs between the bobbin and the flow sensor housing, will normally be such that the piston is displaced by most of its permissible travel at a flow rate at which the associated pressure difference begins to lift off the crest of the bobbin or, in the case of a bi-directional flow sensing device begins to move the crest of the bobbin out of the narrowest portion, of the throat.

A further modification of the low flow range flow sensing characteristics of the flow sensing device according to the present invention may be achieved by providing a spring-loaded poppet which progressively opens a further by-pass fluid passage parallel to the calibrared orifice as flow increases. The pre-load of the poppet spring is to be chosen so as to lead to an extended low flow rate sensing region.

The present invention will now be described further by way of two particular embodiments, and with reference to the accompanying drawings, of which:

Figure 1:
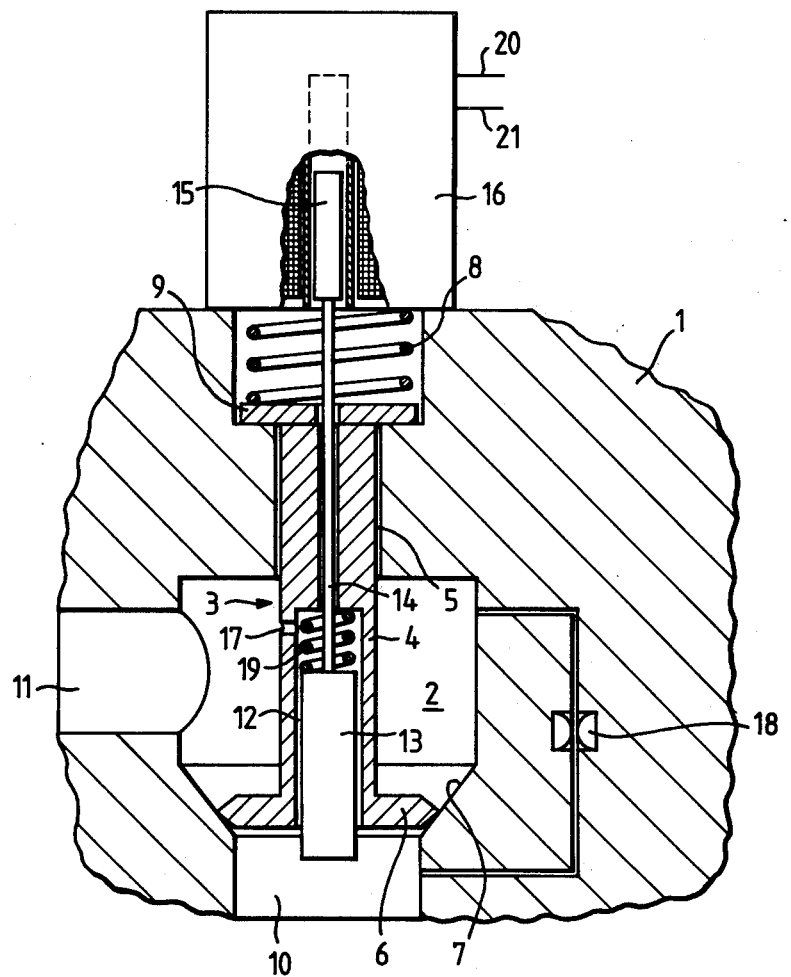
FIG. 1 is a schematic sectional view of a uni-directional flow sensing device.

Referring now to FIG. 1, there is shown, schematically, a section through a uni-directional flow sensor located in a housing 1 which may, for instance, be part of a valve body of an associated hydraulic valve, or which may be a separate component such as a mounting plate to be connected into a hydraulic system. The housing contains a cavity 2 with portions of differing cross-sections and located within the cavity 2 is a flow sensor assembly 3. The flow sensor assembly 3 comprises a flow sensor bobbin 4 guided slidably within a narrow portion 5 of the cavity 2 and carrying at its lower end a sharp-edged disc 6, which cooperates with the interior surface of a tapered throat 7 to provide the variable cross-section flow sensing orifice. A pre-load and return spring 8 acts on the upper end of the flow sensor bobbin 4 via an interposed apertured washer 9. The variable flow sensing orifice lies between an inlet 10 to the flow sensor and an outlet 11. A cylinder, formed by a cylindrical bore 12 in the lower portion of the flow sensor bobbin 4 houses slidably a cylindrical piston 13 which is connected by a push rod 14 to the moveable element 15 of a position sensing device 16. An aperture 17 in the wall of the flow sensor bobbin 4 transmits the outlet pressure to the chamber formed between the upper end surface of the piston and the free space of the cylinder 12 bounded by the interior walls of the flow sensor bobbin 4. The lower end of the piston 13 is exposed to the fluid pressure in the inlet 10. A force transmitting or bias spring 19 operates to urge the piston toward its lower most position. A further fluid connection between inlet 10 and outlet 11 is provided by a by-pass line containing the calibrated orifice 18.

In operation, fluid flow through the flow sensor will commence as soon as the inlet pressure at inlet 10 increases above that in outlet 11. To begin with, flow will be via the calibrated orifice, the pre-load applied by spring 8 on the flow sensor bobbin being chosen to prevent opening of the flow sensing orifice formed between the edge of disc 6 and the throat 7 below a chosen pressure difference. The pressure difference generated by fluid flowing through the calibrated orifice 18 acts across the piston 13 whose lower end surface is directly exposed to the inlet pressure, and whose upper end is subject to the outlet pressure in outlet 11 by virtue of the aperture 17 in the wall of the bobbin 4. The pressure difference arising from the fluid flow causes the piston 13 to move in an upward direction until the force due to the developed pressure differential equals the bias applied by sprinf 19. As a result of this upward movement, the moveable element 15 of the position sensing device 16 is also displaced by the same amount in an upward direction, and the result is an electric output at the terminals 20, 21, commensurate with the displacement of the piston 13, and hence the flow rate because of the relationship between the rate of flow through the orifice 18 and the pressure differential generated thereby.

Increasing the flow rate will lead to successively greater upward displacement of the piston 13 until, near the upper limit of travel of the piston 13, the pressure difference between inlet 10 and outlet 11 is sufficiently large for the variable flow sensing orifice to be opened by the disc 6 being lifted off the throat 7. From this point on the further displacement of the movable element 15 is a function of the bobbin displacement.

The bias applied to the piston 13 by spring 19, and the pre-load applied by spring 8 on the flow sensor bobbin 4, will normally be chosen such that the piston 13 has, at the point of opening of the variable flow sensing orifice, either completely compressed spring 19, or abuts against an internal stop or abutment surface within the bobbin 4. It will be appreciated that the position of the piston 13 within the bobbin 4 is determined almost solely by the pressure difference between inlet 10 and outlet 11, and hence that the pressure at which the variable flow sensing orifice begins to open will, for a sensible choice of the spring forces, always be sufficient to maintain the piston in a raised position until flow drops sufficiently for the variable flow sensing orifice to once again close.

The permissible travel of the piston 13 must, of necessity, be limited to a distance such that the aperture 17 is not obstructed by the piston 13, even for maximum travel of the piston 13, or, in other words, the position of the aperture 17 must be selected with this restraint in mind.

Figure 2:
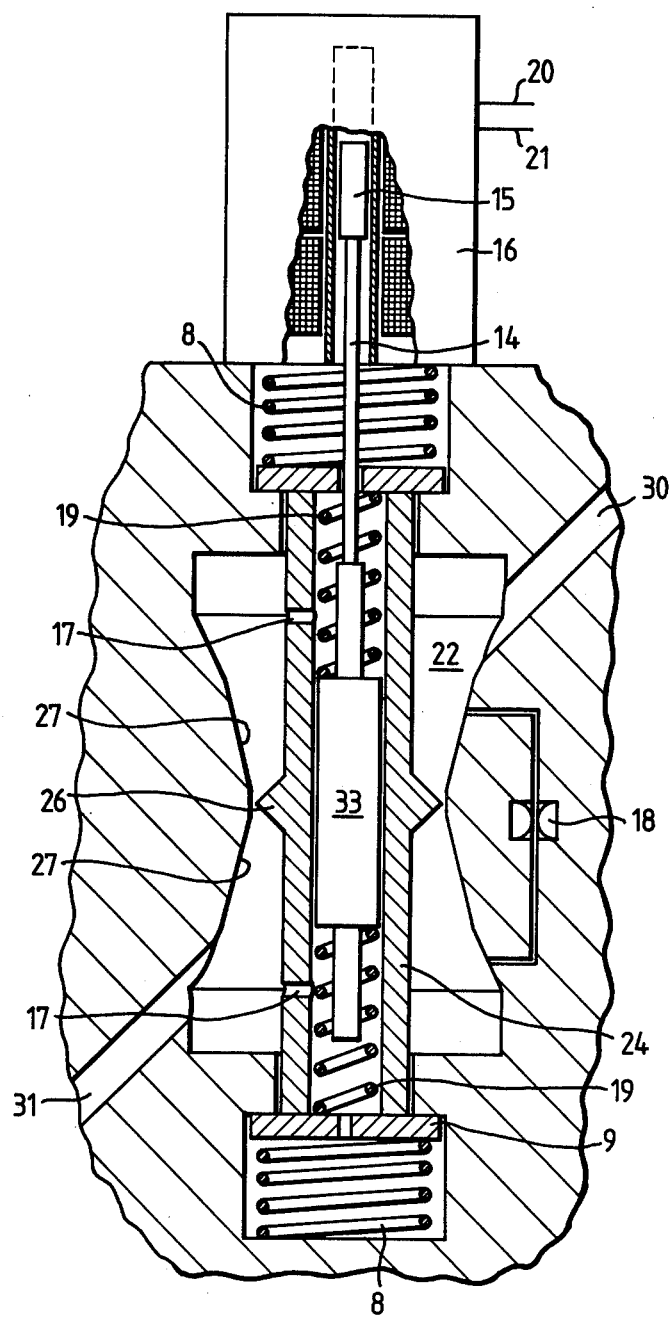
FIG. 2 is a schematic sectional view of a bi-directional flow sensing device.

FIG. 2 shows a flow sensing device similar to the flow sensing device of FIG. 1, save that various components such as the bobbin and the shape of the cavity have been adapted to permit the flow sensing in both direction, that is to say irrespective of whether fluid enters via fluid passage 30 and leaves via fluid passage 31, or enters by fluid passage 31 and leaves the flow sensor via fluid passage 30. Since the general configuration and mode of operation can easily be understood from the principles discussed in relation to FIG. 1, only a brief explanation of the particular features which enable bi-directional operation shall be considered here.

To begin with, both the bobbin 24 and the cavity 22 of the flow sensor are substantially symmetrical about a median plane co-planar with the edge of the crest 26, which here takes the place of the disc 6 of FIG. 1. Each end of the bobbin rests against a centrally apertured disc 9 which, as before, serves to transmit the pre-load and return force from return springs 8. Unlike in the arrangement of FIG. 1, the discs 9 also form the outer abutment surfaces of the bias springs 19 on either side of the piston 33. Since the piston 33 lies now wholly within the bobbin 24, one aperture 17 on each side of the bobbin is now necessary to transmit the pressure extent in the fluid passages 30 and 31 to and from the flow sensor.

To enable flow to be measured in both directions, the linear displacement sensing device must also be adapted to provide measurement of the displacement of both the piston 33 and the bobbin 24 in either direction from their null positions.

In operation, as before, fluid flow between passages 30 and 31 will initially be through the calibrated orifice 18 which, in this case, lies parallel, or maybe identical, with the small annular orifice which exits between the narrowest part of the throat and the crest 26 even in the null position because of the requirement that the bobbin 24 be capable of being displaced either upwards or downwards from the null position. The maximum displacement of the position within the bobbin is determined by the reduced diameter end portions of the piston abutting against the respective disc 9, and as before, the pressure transmitting aperatures are placed to prevent obstruction by the piston 33 even at its extreme ends of travel.

The low flow sensing range of either of the above described devices may be extended further by connecting in parallel to the calibrated orifice 18 a spring-loaded poppet which operates to open progressively with increasing flow rate a further by-pass passage to the variable flow sensing orifice. The effect of such a poppet is to reduce the normally quadratic relationship of flow and pressure differential for the calibrated, fixed, orifice 18 to a lower power. The consequence of this is an extended low flow rate measuring range of the device at the expense of an alteration in the flow vs. displacement characteristics within that range, as illustrated in the graph of FIG. 3 between points I and II.

Figure 3:
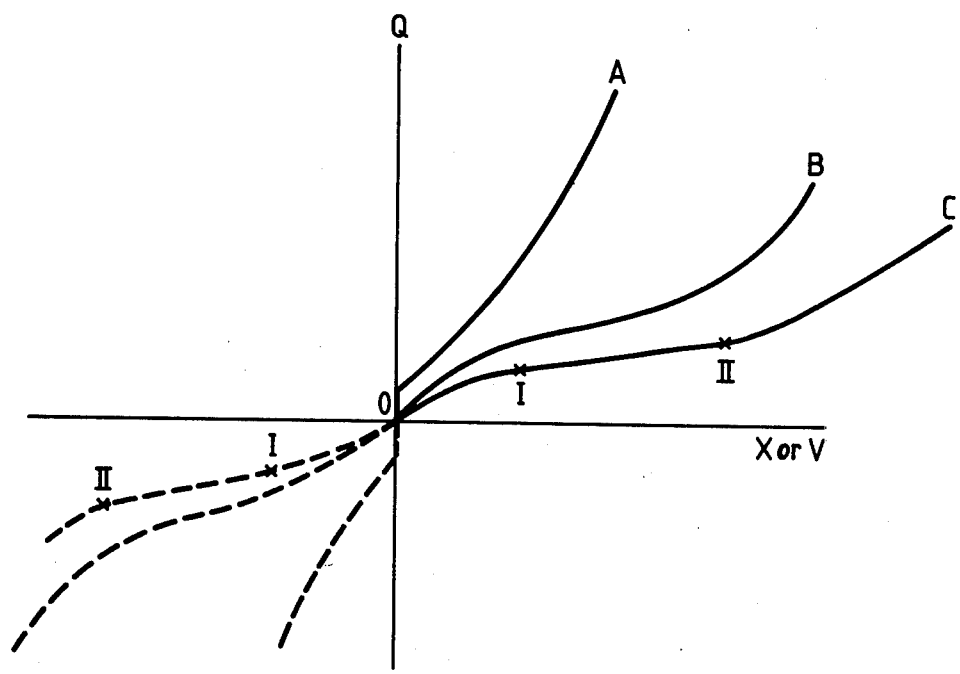
FIG. 3 is a graph showing various flow vs. displacement characteristics.

Curve A in FIG. 3 shows a flow-displacement characteristic for a conventional flow sensing device, curve B the flow-displacement characteristics of the flow sensing device of FIG. 1, and curve C the extended low flow characteristics of a flow sensing device such as that of FIG. 1 but with the addition of a spring loaded poppet. As the last one of these three curves shows, between points O and I, the characteristic is that of a fixed orifice, between points I and II those of a variable linear orifice, and from point II onwards that of a conventional variable orifice flow sensing device. More precisely, at point I the spring-loaded poppet begins to open, straightening the characteristics towards a linear dependency between flow and displacement, with the precise shape of the curve being, of course, a function of the spring constant of the poppet spring. At point II the pressure differential generated by the flow of fluid is sufficient to overcome the pre-load of the main spring 8, and at higher flow rates the effect of the by-pass orifices becomes rapidly negligible compared to the effect of the variable flow sensing orifice between bobbin and throat.

The flow sensing characteristics of a bi-directional flow sensing device will normally be the same, save that the characteristic extends also into the third quadrant of the graph as indicated in broken outline. It should, for the sake of completeness, be noted, however, that the characteristics either side of O need not necessarily be the same.

Figure 4:
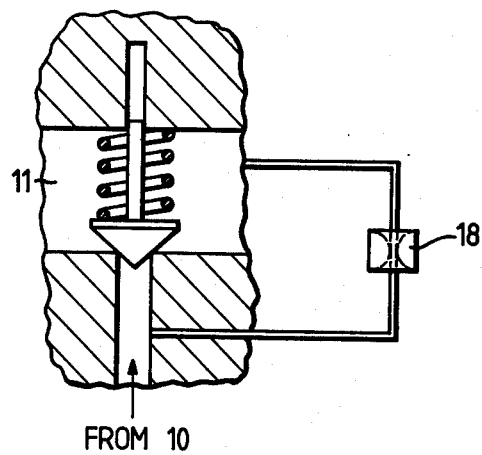
FIG. 4 is a schematic sectional view of a spring-loaded poppet.

The aforementioned poppet may be of a very simple design such as that illustrated in FIG. 4, in which a spring-loaded conical head located in the outlet, operates progressively to open a by-pass line from the inlet.

I claim:

1. A flow sensing device comprising a flow sensor body, a fluid duct formed in said body, a throat in the duct, and a spring-loaded bobbin mounted in the duct so as to be axially movable and having a crest which closes the throat in the duct in the position of zero fluid flow, a spring-loaded piston mounted so as to be axially movable at low flow rates and disposed so that its opposite sides are acted on by fluid pressures upstream of, and downstream of, the throat, said bobbin and piston movable together at high flow rates, displacement sensing means responsive to the combined displacements of the piston and bobbin, and a calibrated orifice connected in parallel with the throat so as to by-pass the flow of fluid between the bobbin and the throat.

2. A flow sensing device according to claim 1 having a fluid passage in parallel with the throat, and a spring-loaded poppet device disposed in said fluid passage and arranged to open a further variable orifice in parallel with throat and the calibrated orifice.

3. A flow sensing device according to claim 1 arranged to respond to bi-directional flow of fluid, in which the narrowest portion of the throat lies at the junction between two oppositely tapered throat surfaces, and at zero flow the crest of the bobbin lies within that narrowest section and is axially moveable in either direction so as to be displaceable in one or the other direction according to the sense of the fluid flow.

* * * * *